UNITED STATES PATENT OFFICE 2,025,590

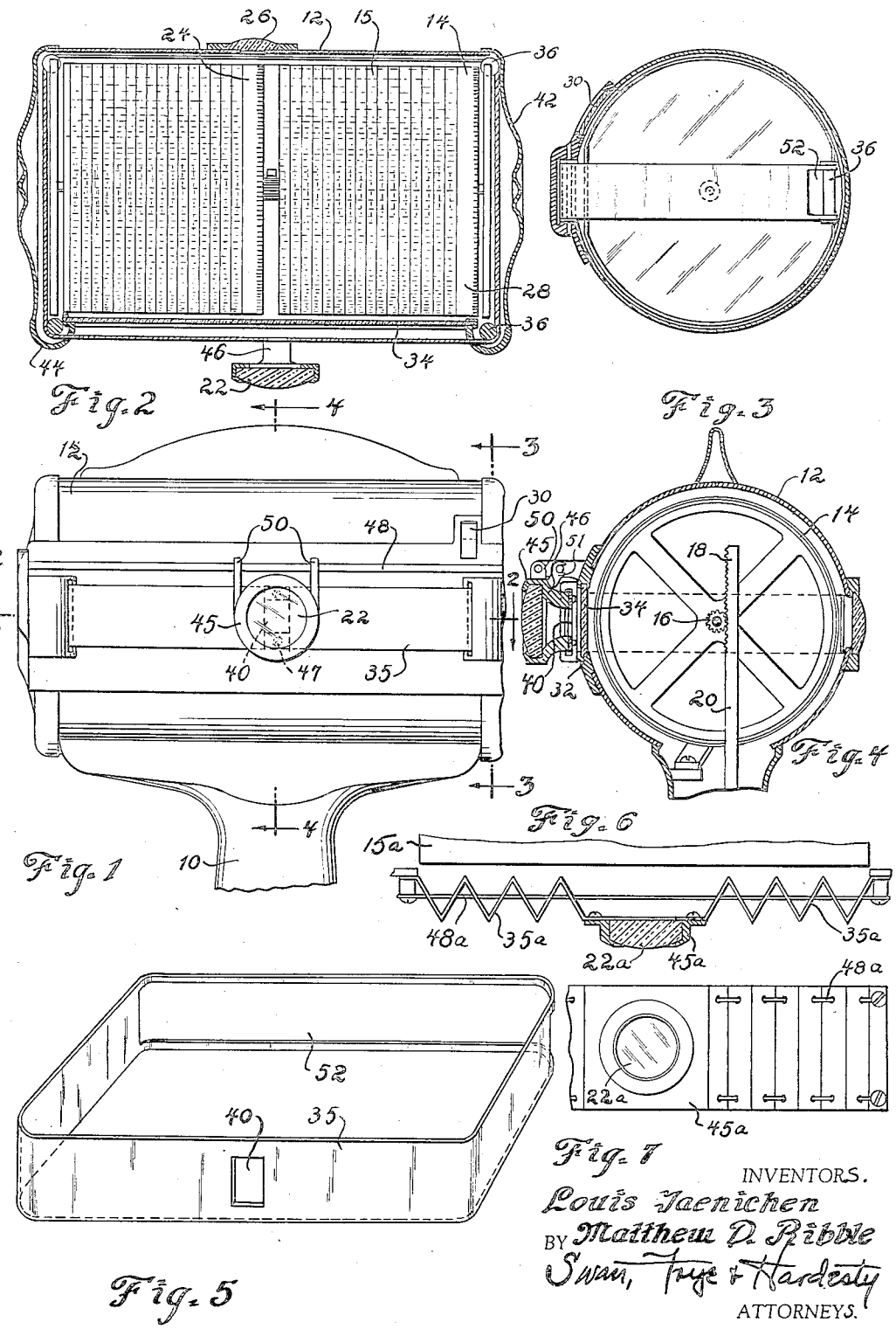

WEIGHING SCALE

Louis Jaenichen, Springfield Township, Oakland County, and Matthew D. Ribble, Ferndale, Mich., assignors to The Standard Computing Scale Company, Detroit, Mich., a corporation of Michigan Application January 19, 1934, Serial No. 707,292

1 Claim. (Cl. 265—29)

This invention relates to weighing scales, and more particularly to the weight indicating and appurtenant portions of computing scales of the cylinder type.

An important object of the invention is the provision of an improved magnifier and novel mounting means therefor, adapted to greatly facilitate reading of the chart of such a scale and so designed that the chart indicia are magnified equally in all dimensions, thereby permitting use of smaller figures upon the chart than was heretofore possible as a result of which a chart may be used which covers a wider range or is divided in finer divisions than those heretofore used.

A further object is the provision of novel means adapted to greatly assist the chart reading of such a scale in the above indicated manner, yet enabling the use of a smaller and less expensive though more efficient magnifier in the form of an ordinary double convex or plano-convex lens instead of the partly cylindrical lens now commonly employed.

Another and primary object is the provision in conjunction with such chart reading apparatus of convenient means enabling easy movement of the lens over various portions of the chart, and for masking from view those portions of the chart not in use, thereby eliminating the chance of errors arising from reading the wrong figures.

Other objects and advantages will readily occur to those skilled in the art upon reference to the following description and the accompanying drawing in which Figure 1 is a front elevational view of the upper portion of a computing scale of the cylinder type incorporating the principles of this invention;

Figure 2 is a horizontal section taken substantially on the line 2—2 of Figure 1 and looking in the direction of the arrows;

Figure 3 is a vertical section taken substantially on the line 3—3 of Figure 1 and looking in the direction of the arrows;

Figure 4 is a vertical section substantially on the line 4—4 of Figure 1 and looking in the direction of the arrows;

Figure 5 is a perspective view of the masking and lens-supporting ribbon removed from the scale;

Figure 6 is a view partly in horizontal section and partly in plan, fragmentarily showing a portion of a scale incorporating the invention in somewhat modified form; and Figure 7 is a front elevational view of the masking and lens-supporting means of the embodiment of Fig. 6.

Referring now to the drawing, and particularly to Figure 1, which shows the upper portion of a cylinder scale of generally conventional, though it might be of any desired construction, with its leading portions modified in accordance with the principles of this invention. The pedestal 10 carries at its top the cylinder housing 12 within which is rotatably mounted a cylindrical chart 14. The lower portions of the scale, within which are ordinarily contained the load-receiving and counterbalancing means, since they form no part of the invention, are not shown; they also may obviously be of any suitable or desired construction. The chart 14 is shown as actuable through a pinion 16 and rack 18, the latter carried by rack rod 20. The chart 14 is graduated in price indicia, as at 15, in the usual or any desired manner. Such indicia may be of smaller size than are ordinarily usable, however, by reason of the fact that the magnifier or lens 22 through which they are read by a user of the computing portion of the scale is of the partly spherical rather than the partly cylindrical variety, and hence magnifies equally in all directions, rather than merely magnifying the indicia in one dimension only, as do the partly cylindrical lenses now commonly used for this purpose.

Centrally carried by the chart are weight indications 24 adapted to be read from the other side of the scale, which is the rear or customer-side, through another magnifying lens 26 fixedly carried by the cylinder housing in proper relation to this weight scale. Another weight scale provided with figures inverted with relation to those of scale 24 is provided near one end of chart 14 to be properly readable through an opening 30 in the front of the cylinder housing.

Along the front of the cylinder housing extends a longitudinal opening 32 through which the price indications carried by the chart would be visible throughout its length were it not for the masking ribbon 35, which will presently be more particularly described. The opening 32 may be closed by a transparent window, as 34.

Extending longitudinally around the cylinder is a flexible tape or ribbon-like member 35 supported by and movable over rollers 36 journaled in the cylinder housing at the four corners of its rectangular path, as in the manner best indicated in Figures 2 and 3. The ribbon is exposed along the front of the cylinder and covers the chart-reading window opening 32 except for the opening 40 in the tape over which is arranged the reading lens 22.

The end caps 42 of the cylinder housing are provided with projecting portions 44 within which the front rollers are rotatably supported, the forward projecting roller-containing portions 44 enabling the ribbon to run freely across the space in front of the window 34, in the manner clearly indicated in Figure 2. The other three sides of the rectangularly arranged ribbon are housed within the cylinder housing. The magnifier 22 is attached to the ribbon in any suitable manner, being shown framed in a bezel 45 having an integral connecting and neck portion 46 attached to the tape, as by means of screws 47. The connecting portion 46 is of course hollow and so contoured interiorly as to offer no interference with the readability of the chart through the lens and ribbon opening 40. Obviously the tape or ribbon 35 may be formed either of spring or other resilient metal, or of any other suitable flexible material, such as fabric or belting.

Additional or if desired the entire support for the magnifier and its frame may be provided by one or more guiding and supporting rods, as 48, 49 which are carried by the cylinder housing above the tape and slidably over which are fitted upwardly projecting hanger and guide members 50—51 attached to the lens frame. It will be seen that by moving the lens longitudinally along the chart, the ribbon being of course similarly moved by reason of its attachment to the lens frame and its freedom to travel over the rollers, the various portions of the chart may be read through the lens by simply moving it to desired position, and that all other portions of the chart are constantly and effectively masked by the tape, which thus prevents the errors which frequently arise through the accidental reading of the wrong figures. The tape may be provided with a clearance slot 52 extending longitudinally of the portion thereof which during travel of the ribbon would otherwise obstruct the lens 26 through which scale 24 is read, the clearance slot being of course preferably wider than the window over which the lens 26 is arranged, so that a customer's visibility of the scale 24 is not interfered with by the presence of the tape. It is of course obvious that the ribbon need not be strong enough to support the lens, the entire support for which may be furnished by the rod 48 and hangers 50, or that the tape may furnish some or all of the lens support, as desired.

It will also be seen that other masking means might be substituted for the tape 35. Figures 6 and 7 show such a modification. In these views analogous portions have been given like reference numerals with the addition of the distinguishing character "a". The lens frame 45a is in these views shown attached to accordion-pleated masking members 35a, which may either be formed of a continuous folded strip of material, which is limp at least at the folds, in the form shown, or may be of relatively stiff hinged articulated panel-like members connected after the manner of formation of a Venetian blind. In either event they are preferably guided and supported by longitudinal rods or wires as 48a. By virtue of this construction it will be seen that as the lens is moved in either direction the masking member at one end is collapsed and at the other end extended to permit such movement, the shielding effect and manner of operation being generally similar in results to the first described embodiment.

While it will be apparent that the illustrated embodiments of this invention herein disclosed are well calculated to adequately fulfill the objects and advantages primarily stated, it is to be understood that the invention is susceptible to variation, modification and change within the spirit and scope of the subjoined claim.

What we claim is:

In a weighing scale having a rotatable cylindrical chart, a housing enclosing the chart and having an elongated opening therein upon one side extending longitudinally of the chart, through which the chart is readable, and a smaller opening directly opposite the elongated opening, means for facilitating the reading of the chart comprising a lens, means slidably supporting the lens for movement along said opening to enable reading different portions of the chart through said lens and opening, and means for masking those portions of the chart not in line with the lens, comprising a flexible ribbon-like masking member formed as a closed loop connected to and movable with the lens and lying in a rectangular path extending longitudinally around the cylinder in a common plane with both the axis of the chart and said opening, the masking member having a portion extending along and obstructing vision through portions of the opening not in line with the lens, and having a slot therein exposing the smaller opening throughout all positions of movement of the masking member and lens, and means arranged at the ends of the chart and the corners of the rectangular path of the masking member for movably supporting said member in such manner that it extends around the chart.

LOUIS JAENICHEN.
MATTHEW D. RIBBLE.